Figure 1:
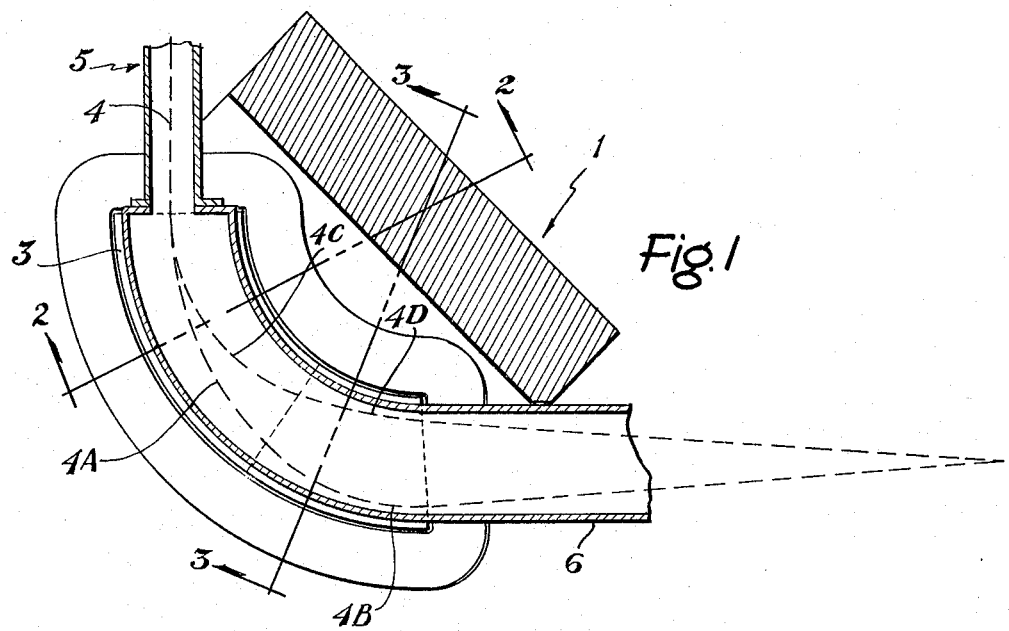

Nov. 22, 1966     J. H. BLY ETAL     3,287,558
CHARGED PARTICLE DEFLECTING DEVICE CONSISTING OF SEQUENTIALLY
POSITIONED UNIFORM AND NON-UNIFORM MAGNETIC FIELD SECTORS
Filed Sept. 8, 1961     3 Sheets-Sheet 1

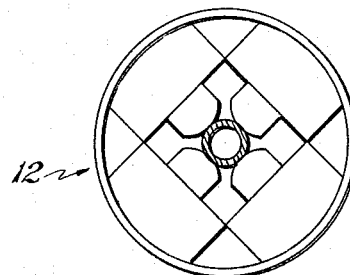
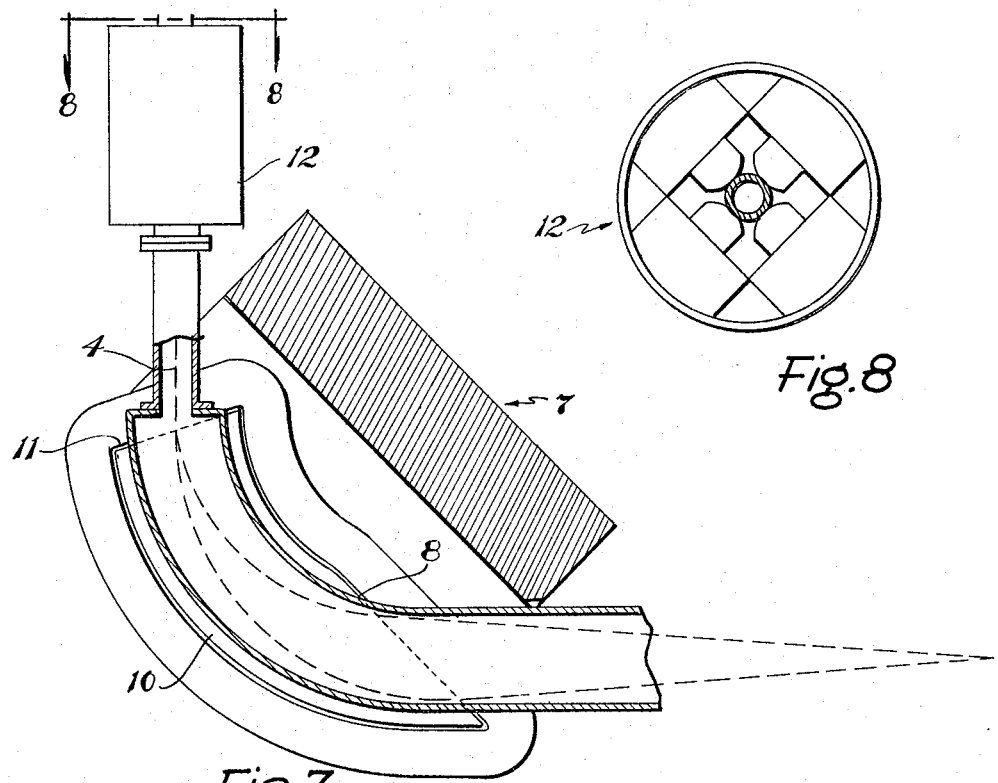
Fig. 7
Fig. 8
Fig. 9
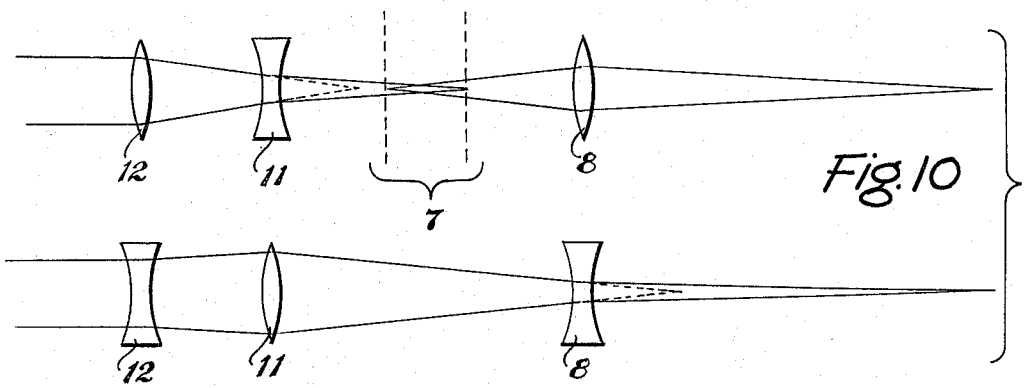
Fig. 10

United States Patent Office 3,287,558
Patented Nov. 22, 1966

3,287,558
CHARGED PARTICLE DEFLECTING DEVICE CONSISTING OF SEQUENTIALLY POSITIONED UNIFORM AND NON-UNIFORM MAGNETIC FIELD SECTORS
James H. Bly, Lexington, and Harald A. Enge, Winchester, Mass., assignors to High Voltage Engineering Corporation, Burlington, Mass., a corporation of Massachusetts
Filed Sept. 8, 1961, Ser. No. 136,928
1 Claim. (Cl. 250—49.5)

This invention relates to apparatus for bending beams of charged particles and in particular to magnetic apparatus for this purpose.

In connection with particle accelerators for the acceleration of charged particles to high velocity, it is frequently desirable to have additional apparatus for changing the direction of the charged particle beam which has been accelerated by the particle accelerator. The desirability of bending the charged particle beam may be caused, for example, by geometrical limitations of the room in which the particle accelerator is located or it may be desired to direct the charged particle beam alternatively into one of several beam utilization areas. In electron irradiation installations it is frequently desirable because of space limitations to have the accelerator mounted horizontally, but because of product conveyor considerations, it may be desirable to have the emergent beam traveling in the vertical direction as it strikes the product. Similarly it will occasionally be desirable in the radiographic installations to cause the electron beam to be deflected before striking the target. In the case of large accelerators for the acceleration of charged particles to high energy for studies in nuclear physics and the like, the cost of operating the accelerator and the original capital costs of the accelerator are so large that it is desired to use such an accelerator for a variety of purposes, and as a result, generally there will be several beam utilization areas associated with such an accelerator and some sort of beam bending device is required such as a switching magnet in order to direct the beam into one of the beam utilization areas.

It will be apparent from the foregoing that the invention is not limited to any particular deflection angle. However, for the purposes indicated, a very common angle of deflection is 90° and so the invention will be described with particular reference to 90° bending, but it will be apparent from the following that the invention is not limited to a 90° bending.

Of course, it is well known that a magnetic field transverse to the direction of motion of a charged particle will exert a deflecting force on the charged particle. However, the deflecting action itself always introduces some focusing or defocusing action which will have an undesirable result unless proper precautions are taken. In particular the inherent energy spread in the beam from a microwave linear electron accelerator, and the uncertainty in correlation of the energy spread to the cross section of the beam, introduce problems which are not encountered in magnetic systems used with accelerators producing a monoenergetic beam. In general, there are two types of focusing and two planes in which this focusing can take place. The median plane is the plane defined by the central axis of the beam as it is bent by the bending apparatus, and in this plane there is both spatial focusing and momentum focusing. These two types of focusing also occur in the curved surface which includes the central axis of the charged particle beam and which is perpendicular to the median plane, and this focusing is generally referred to as focusing in the vertical plane, although of course this plane may or may not be vertical with respect to the earth's surface.

Figure 2:
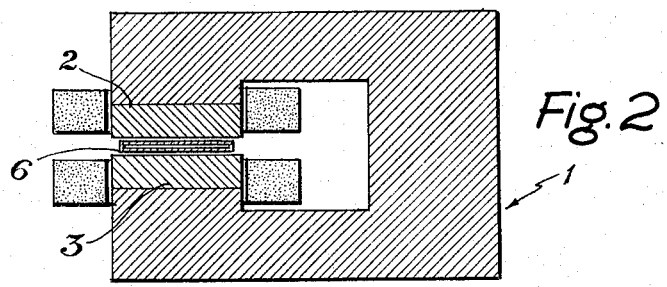
Figure 3:
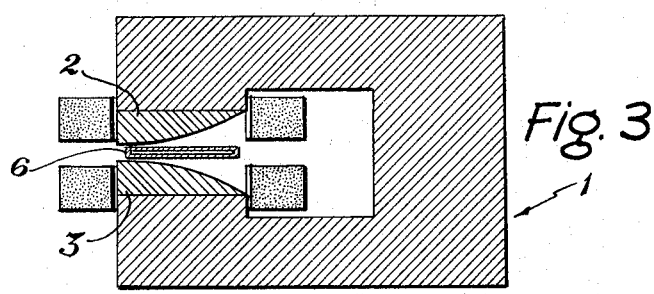
Figure 4:
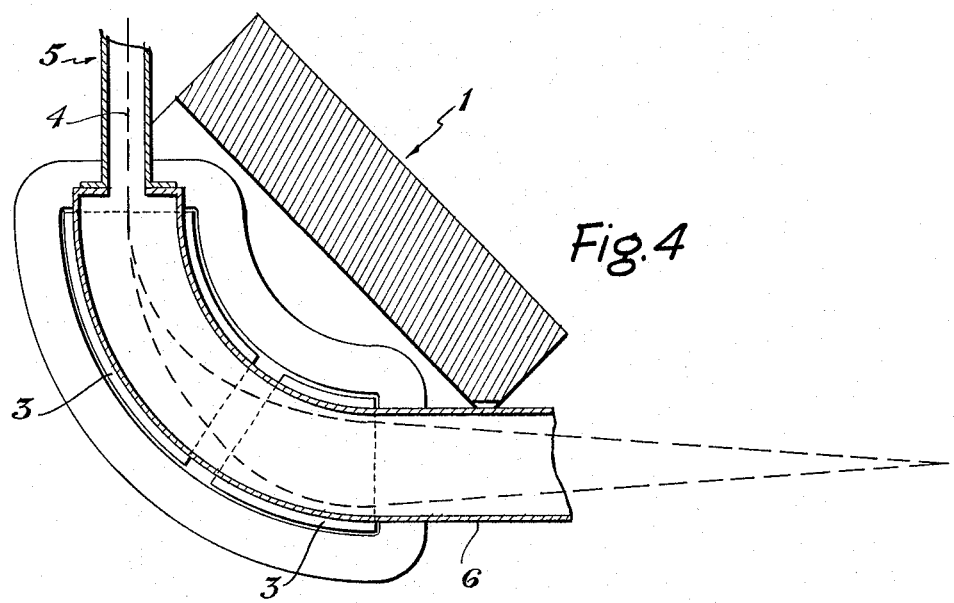
Figure 5:
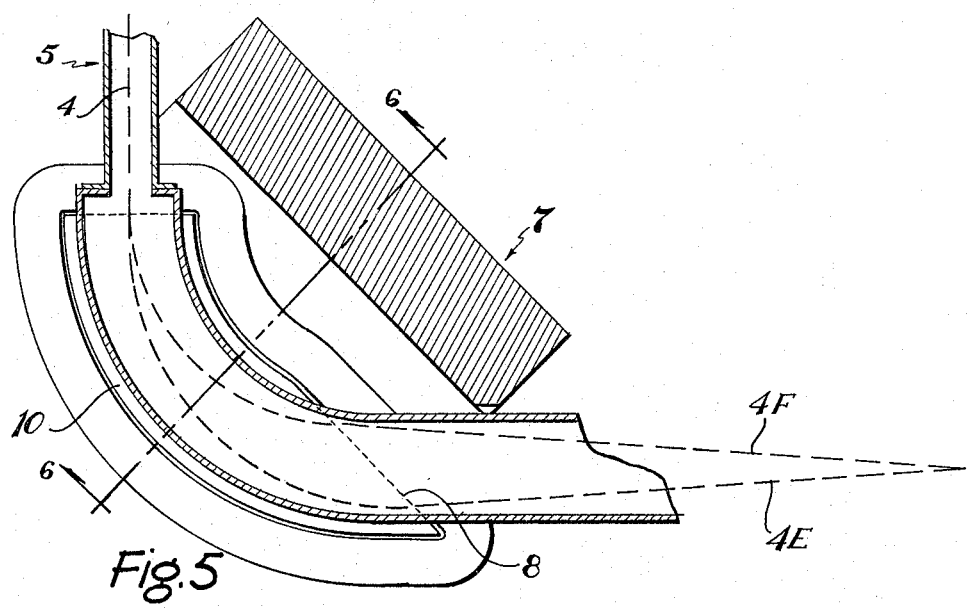
Figure 6:
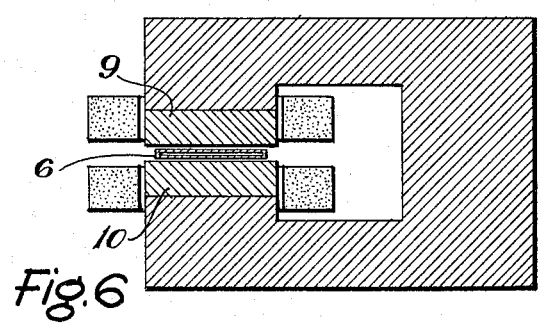

The invention may best be understood with reference to the following detailed description thereof having reference to the accompanying drawings in which:

FIG. 1 is a top view of the lower pole face of a horizontally disposed bending magnet constructed in accordance with the principles of the invention;
FIG. 2 is a sectional view along the line 2—2 of FIG 1;
FIG. 3 is a sectional view along the line 3—3 of FIG. 1;
FIG. 4 is a view similar to that of FIG. 1 showing an alternative embodiment of the invention;
FIG. 5 is a view similar to that of FIG. 1 showing still another embodiment of the invention;
FIG. 6 is a sectional view along the line 6—6 of FIG. 5.
FIG. 7 is another view similar to that of FIG. 1 and showing still another embodiment of the invention;
FIG. 8 is a sectional view along the line 8—8 of FIG. 7;
FIG. 9 is a diagram illustrating the principal planes of a deflecting magnet; and
FIG. 10 is a diagram illustrating the optical equivalent of the apparatus of FIG. 7.

Referring to the drawings and first to FIGS. 1, 2 and 3 thereof a magnet 1 having a pair of pole faces 2, 3 is positioned in the path of a charged particle beam 4 which may be produced, for example, by a suitable charged particle accelerator 5 so that the charged particle beam 4 enters between the pole faces 2, 3 of the magnet 1. Of course, this charged particle beam 4 will in general have to travel in an evacuated region and accordingly a suitable vacuum chamber 6 must surround the beam 4 at all times during its trajectory. Charged particles traveling through the magnetic field between the pole faces 2, 3 of the magnet 1 will travel in a circle having a radius of curvature which is proportional to the momentum of the particle and inversely proportional to the strength of the magnetic field, as is well known. In the first part of the magnet 1, as shown in FIG. 2, the pole faces 2, 3 are flat and equi-distant, so that the magnetic field is uniform. As a result, the radius of curvature of the trajectory of the particles will be proportional only to the momentum of the particles. As a result, momentum dispersion will be introduced into the charged particle beam 4, as shown in FIG. 1. In accordance with the embodiment of the invention shown in FIG. 1, the defocusing effect occasioned by this momentum dispersion is corrected by making the magnetic field in the second part of the magnet 1 not uniform but increasing in strength towards the outer periphery of the curved trajectories. This may be accomplished, for example, by shaping the pole faces 2, 3 in the manner shown in FIG. 3. The pole faces 2, 3 are preferably shaped so that the gap between them is proportional to the $n$th power of the distance from a common axis perpendicular to the median plane of the gap. Thus the high momentum charged particles which travel along a path 4A having a relatively large radius of curvature in the first part of the magnet will travel through a relatively strong magnetic field in the second part of the magnet and accordingly will travel along a path 4B of relatively short radius of curvature. Particles having less momentum, which therefore traveled along a path 4C with a smaller radius of curvature in the first part of the magnet, will accordingly travel in a region of less intense magnetic field strength in the second part of the magnet so that the radius of curvature of their trajectory 4D will be reduced with respect to that traversed by particles of higher momentum. As a result, as shown in FIG. 1, the momentum dispersion is corrected and the particles are brought to a focus at an appropriate point which will depend, of course, upon the properties of the magnet, including the value of $n$ and other parameters, which can be adjusted in accordance with principles well known in the art.

The essential feature of the embodiment of the invention shown in FIGS. 1 through 3 is that the magnetic field through which the charged particles are bent is divided into two parts: first, a uniform part and, second, a non-uniform part. It is not necessary that these parts be contiguous as shown in FIG. 1. Alternatively, the two parts may be separated in the manner shown in FIG. 4.

The momentum dispersion which is introduced by bending a charged particle beam through a uniform magnetic field may also be corrected in accordance with the invention by proper shaping of the exit surfaces of the pole faces of the magnet, as shown in FIG. 5. In the case of the magnet 7 of FIG. 5, instead of having the exit surface of the pole faces normal to the beam trajectory as shown in FIGS. 1 and 4, this exit surface 8 is at an angle thereto as shown in FIG. 5, so that the charged particles having higher momentum remain the magnetic field for a longer period of time than charged particles having lower momentum with the result that, as all the charged particles emerge from between the pole faces 9, 10 of the magnet 7 along tangents to their respective circular paths at the exit surface 8, the trajectories 4E of the higher momentum charged particles will be directed so as to converge towards the trajectories 4F of the lower momentum charged particles, as shown in FIG. 5. The angular displacement of the exit surface 8 of the pole faces of the magnet from the surface normal to the beam trajectory must be at least 45° and its precise value will depend upon the point at which it is desired to focus the charged particle beam.

In accordance with the embodiments of the invention heretofore described, momentum focusing has been achieved in the median plane. Insofar as first order effects are concerned, no momentum dispersion is produced in the vertical plane nor is any momentum focusing produced therein. However, in the embodiments of the invention described heretofore, there is spatial defocusing in the vertical plane and a spatial focusing effect is produced in the median plane. However, this spatial focusing effect in the median plane will not in general bring the beam to a focus at the same point as that in which momentum focusing has been achieved.

In accordance with the invention spatial focusing in the median plane may be added to the momentum focusing hereinbefore described by varying the angle between the incident surface of the pole faces of the magnet and the surface normal to the beam trajectory. Such an alteration may be made in either of the two embodiments heretofore described, but by way of example only it will now be described with reference to apparatus of the type shown in FIG. 5.

Referring now to FIG. 7, the magnet 7 therein shown is identical to that shown in FIG. 5, except that incident surface 11 of the pole faces 9, 10 of the magnet 7 is inclined with respect to the surface normal to the beam trajectory. The change in the beam trajectory which the introduction of this inclination produces is the same as that which would be produced by a sector lens comprising a pair of sector-shaped magnets positioned in the sector-shaped areas lying between the surface normal to the beam trajectory and the inclined incident surface 11. The introduction of this inclination will have no first order effect on the momentum focusing but will affect spatial focusing in the median plane in a mannar which can readily be controlled by alternation of the angle of inclination.

It can also be shown that the effect of introducing the angle of inclination of the incident surface 11 is similar to the addition of a sector lens not only with regard to the effect of spatial focusing in the median plane, but also with regard to its effect on spatial focusing in the vertical plane. That is to say, the focusing effect produced in the vertical plane is equal and opposite to that produced in the median plane. Thus, the introduction of this angle of inclination can only correct spatial focusing in one plane, and it is not possible in general to produce an image with correct momentum focusing and correct spatial focusing in both directions without introducing a third variable parameter. In accordance with the invention, this situation is rectified by providing a sector lens similar to the sector lens hereinbefore described except that it exerts a focusing action in that plane in which the sector lens hereinbefore described introduces a defocusing effect. In principle, this could be accomplished by adding a sector lens just before the magnet shown in FIG. 7. However, it is known that a single quadrupole lens has precisely the same effect as a sector lens, and so, in accordance with the embodiment of the invention shown in FIG. 7, a single quadrupole lens 12 is introduced just prior to the deflecting magnet 7 of FIG. 7. The characteristics of the quarupole lens 12 and the angle of inclination of the incident surface 11 of the deflecting magnet 7 will vary, depending upon the point at which it is desired to bring the particles to a focus. Just as the angle of inclination of the incident surface 11 of the deflecting magnet 7 introduced no momentum focusing action, so the introduction of the quadrupole lens 12 has no effect on momentum focusing. In general it will be desired to have the combination of the quadrupole lens 12 and the incident surface 11 of the deflecting magnet 7 produce spatial focusing in both planes at a point which coincides with the momentum focus determined by the deflecting magnet 7. In general, the quadrupole lens 12 and the inclined incident surface 11 will act like a conventional alternating gradient lens pair which can be caused to produce an image of the original beam at one point along the trajectory in the median plane and at another point along the beam trajectory in the vertical plane, these two image points then serving as the object for the lens formed by the inclined exit surface 8 of the deflecting magnet 7. This may be seen from the following analysis.

A single deflecting magnet will normally give dispersion; that is, an angular spread proportional to the spread in momentum of the particles in the beam. As an example, and referring to FIG. 9, consider a deflecting magnet 13 with normal entrance and exit for the beam 14 and with a deflecting angle $\phi$. The radius of curvature of the particles of mean energy is R; call this the central ray. A particle with a different energy, such that the radius of curvature differs from the central ray by the amount $\Delta R$, will emerge from the magnet at an angle between its trajectory and the central ray equal to $$\beta = \frac{\Delta R}{R} \sin \phi \qquad (1)$$

If we trace these rays backwards into the magnet, disregarding the bending of the beam, they appear both to be coming from a point on the central ray at a distance $$d = R \tan \frac{\phi}{2} \qquad (2)$$

from the exit. The two rays were assumed to coincide at the entrance of the magnet. If they do not coincide at the entrance of the magnet, the particles will not all appear to be coming from the same point inside the magnet. However, we can, with the aid of the combination of the quadrupole lens 12 of FIG. 7 and the inclined incident surface 11 of the deflecting magnet 7 of FIG. 7 form a sharp image in the median plane at the position given by Eq. 2. At the exit end, all particles will appear to come from this image, independent of their energy or median-plane position at the entrance. The inclined exit surface 8 of the deflecting magnet 7 of FIG. 7 can refocus this image.

Part of the median-plane focusing action is done by the deflecting magnet itself. The requirements on the combination of the quadrupole lens and the inclined incident surface can be stated in terms of a point inside the magnet towards which the entering beam has to converge. The particular type magnet in question can be treated as an ion-optics system with focal length $$f = \frac{R}{\sin \phi} \quad (3)$$

as measured from the principal planes. The first principal plane is at a distance from the entrance of the magnet $$d_p = R \tan \frac{\phi}{2} \quad (4)$$

The second principal plane is at the same distance from the exit (the planes are crossed over $\tan \phi/2 > \phi/2$, see FIG. 9).

By comparing Eq. 2 and Eq. 4, one finds that the angular spread from difference in energy appears to originate from the second principal point. In the median plane, therefore, the focus should occur at the same point as seen from the exit. This will be accomplished by letting the particles go into the magnet converging towards the first principal point. In other words, the combination of the quadrupole lens and the inclined incident surface has to focus the rays in the median plane towards the point at a distance $R \tan \phi/2$ from the magnet entrance.

The optical equivalent of the whole system of FIG. 7 is shown in FIG. 10.

Having thus described the principles of the invention, together with several illustrative embodiments thereof, it is to be understood that, although specific terms are employed, they are used in a generic and descriptive sense, and not for purposes of limitation, the scope of the invention being set forth in the following claim.

We claim:

Magnetic apparatus for bending beams of charged particles comprising means for producing a magnetic field transverse to the plane defined by an arcuate beam trajectory, said magnetic field intersecting said plane over two permissibly contiguous areas including said trajectory and having respectively anterior and posterior positions along said trajectory, said magnetic field being uniform in said anterior area in the vicinity of said trajectory and the intensity of said magnetic field in said posterior area in the vicinity of said trajectory increasing approximately in proportion to the $n$th power of the distance from a common axis perpendicular to said plane towards the outer periphery of said trajectory.

References Cited by the Examiner

UNITED STATES PATENTS

| | | | |
|---|---|---|---|
| 2,572,600 | 10/1951 | Dempster | 250—41.93 |
| 2,719,924 | 10/1955 | Oppenheimer et al. | 250—41.93 |
| 2,909,688 | 10/1959 | Archard | 250—49.5 |
| 2,914,675 | 11/1959 | Van Dorsten | 250—49.5 |
| 2,932,738 | 4/1960 | Bruck | 250—41.93 |
| 2,947,868 | 8/1960 | Herzog | 250—41.93 |
| 3,084,249 | 4/1963 | Enge | 250—41.9 |

WALTER STOLWEIN, *Primary Examiner.*

RALPH G. NILSON, *Examiner.*

W. F. LINDQUIST, *Assistant Examiner.*